United States Patent
Wachenschwanz et al.

(10) Patent No.: US 7,608,193 B2
(45) Date of Patent: Oct. 27, 2009

(54) PERPENDICULAR MAGNETIC DISCRETE TRACK RECORDING DISK

(75) Inventors: David E. Wachenschwanz, Saratoga, CA (US); Gerardo A. Bertero, Redwood City, CA (US); David Treves, Palo Alto, CA (US); Andrew Homola, Morgan Hill, CA (US); James L. Chao, Fremont, CA (US); Christopher H. Bajorek, Los Gatos, CA (US)

(73) Assignee: WD Media, Inc., San Jose, CA (US)

( * ) Notice: Subject to any disclaimer, the term of this patent is extended or adjusted under 35 U.S.C. 154(b) by 0 days.

(21) Appl. No.: 11/588,698

(22) Filed: Oct. 27, 2006

(65) Prior Publication Data

US 2007/0039922 A1    Feb. 22, 2007

Related U.S. Application Data

(63) Continuation of application No. 10/306,315, filed on Nov. 27, 2002, now Pat. No. 7,147,790.

(51) Int. Cl.
*B44C 1/22* (2006.01)

(52) U.S. Cl. .......................................... 216/22; 216/52

(58) Field of Classification Search ........................ None
See application file for complete search history.

(56) References Cited

U.S. PATENT DOCUMENTS

| | | | |
|---|---|---|---|
| 5,029,317 A | | 7/1991 | Kawai et al. |
| 5,259,926 A | | 11/1993 | Kuwabara et al. |
| 5,482,777 A | | 1/1996 | Yamakawa et al. |
| 5,482,785 A | * | 1/1996 | Mahvan et al. ............... 428/611 |
| 5,512,131 A | | 4/1996 | Kumar et al. |
| 5,537,282 A | * | 7/1996 | Treves et al. ................ 360/135 |
| 5,568,331 A | * | 10/1996 | Akagi et al. .............. 360/77.07 |
| 5,673,156 A | | 9/1997 | Chen et al. |
| 5,738,906 A | | 4/1998 | Momose et al. |
| 5,750,270 A | * | 5/1998 | Tang et al. ................... 428/611 |
| 5,772,905 A | | 6/1998 | Chou |
| 5,786,093 A | | 7/1998 | Naruse et al. |
| 5,820,769 A | | 10/1998 | Chou |
| 5,828,536 A | | 10/1998 | Morita |
| 5,940,250 A | | 8/1999 | McNeil et al. |
| 5,956,216 A | | 9/1999 | Chou |

(Continued)

FOREIGN PATENT DOCUMENTS

EP    0509361 A2    10/1992

(Continued)

OTHER PUBLICATIONS

Malaysian Search Report, Application No. PI20033891, dated Apr. 19, 2007, 1 page.

(Continued)

*Primary Examiner*—Allan Olsen
(74) *Attorney, Agent, or Firm*—Blakely, Sokoloff, Taylor & Zafman LLP

(57) ABSTRACT

A method of forming a discrete track recording pattern on a soft magnetic underlayer of a perpendicular magnetic recording disk. In one embodiment, the soft magnetic underlayer is continuous throughout the discrete track recording pattern.

10 Claims, 9 Drawing Sheets

U.S. PATENT DOCUMENTS

| | | | |
|---|---|---|---|
| 5,958,544 A | 9/1999 | Usuki | |
| 5,995,309 A | 11/1999 | Suzuki et al. | |
| 6,103,339 A | 8/2000 | Lin et al. | |
| 6,104,579 A * | 8/2000 | Kamoshita et al. | 360/135 |
| 6,120,836 A | 9/2000 | Usuki | |
| 6,123,603 A | 9/2000 | Tada et al. | |
| 6,146,755 A | 11/2000 | Guha et al. | |
| 6,150,015 A | 11/2000 | Bertero et al. | |
| 6,166,885 A | 12/2000 | Yamamoto et al. | |
| 6,168,845 B1 | 1/2001 | Fontana et al. | |
| 6,309,580 B1 | 10/2001 | Chou | |
| 6,381,090 B1 | 4/2002 | Suzuki et al. | |
| 6,391,213 B1 * | 5/2002 | Homola | 216/22 |
| 6,406,611 B1 | 6/2002 | Engelhaupt et al. | |
| 6,426,155 B1 | 7/2002 | Tada et al. | |
| 6,440,520 B1 * | 8/2002 | Baglin et al. | 428/847.7 |
| 6,482,742 B1 | 11/2002 | Chou | |
| 6,510,015 B2 * | 1/2003 | Sacks et al. | 360/75 |
| 6,518,189 B1 | 2/2003 | Chou | |
| 6,572,922 B1 | 6/2003 | Wang et al. | |
| 6,594,103 B1 | 7/2003 | Despain et al. | |
| 6,606,208 B2 | 8/2003 | Ishida et al. | |
| 6,617,012 B1 | 9/2003 | Wang et al. | |
| 6,622,907 B2 | 9/2003 | Fanti et al. | |
| 6,624,957 B1 | 9/2003 | Yun | |
| 6,624,976 B2 * | 9/2003 | Takino | 360/135 |
| 6,665,145 B2 | 12/2003 | Wada | |
| 6,667,118 B1 * | 12/2003 | Chang et al. | 428/829 |
| 6,703,099 B2 | 3/2004 | Belser | |
| 6,713,197 B2 | 3/2004 | Nakamura et al. | |
| 6,738,207 B1 | 5/2004 | Belser et al. | |
| 6,748,865 B2 | 6/2004 | Sakurai et al. | |
| RE38,544 E | 7/2004 | Chen et al. | |
| 6,814,898 B1 | 11/2004 | Deeman et al. | |
| 6,858,319 B2 | 2/2005 | Yasui et al. | |
| 6,999,279 B2 * | 2/2006 | Lundstrom | 360/131 |
| 7,019,924 B2 | 3/2006 | McNeil et al. | |
| 7,147,790 B2 | 12/2006 | Wachenschwanz | |
| 7,225,528 B2 | 6/2007 | Suwa et al. | |
| 7,394,622 B2 | 7/2008 | Gage et al. | |
| 7,471,484 B2 | 12/2008 | Wachenschwanz et al. | |
| 2001/0053051 A1 | 12/2001 | Umehara et al. | |
| 2002/0042027 A1 | 4/2002 | Chou | |
| 2002/0071214 A1 | 6/2002 | Belser | |
| 2002/0086184 A1 | 7/2002 | Wu et al. | |
| 2002/0132482 A1 | 9/2002 | Chou | |
| 2002/0135939 A1 | 9/2002 | Wada | |
| 2002/0136927 A1 | 9/2002 | Hieda | |
| 2002/0167117 A1 | 11/2002 | Chou | |
| 2002/0177319 A1 | 11/2002 | Chou | |
| 2002/0186506 A1 * | 12/2002 | Sato et al. | 360/135 |
| 2002/0187295 A1 * | 12/2002 | Nishikawa et al. | 428/65.3 |
| 2003/0022024 A1 | 1/2003 | Wachenschwanz | |
| 2003/0034329 A1 | 2/2003 | Chou | |
| 2003/0064251 A1 * | 4/2003 | Uwazumi et al. | 428/694 BM |
| 2003/0080471 A1 | 5/2003 | Chou | |
| 2003/0080472 A1 | 5/2003 | Chou | |
| 2003/0162057 A1 | 8/2003 | Matsunuma et al. | |
| 2003/0170995 A1 | 9/2003 | Chou | |
| 2003/0170996 A1 | 9/2003 | Chou | |
| 2003/0179481 A1 | 9/2003 | McNeil et al. | |
| 2004/0058197 A1 | 3/2004 | Nakamura et al. | |
| 2004/0072036 A1 | 4/2004 | Kubota et al. | |
| 2004/0101713 A1 | 5/2004 | Wachenschwanz | |
| 2004/0224119 A1 | 11/2004 | Yamakage et al. | |
| 2004/0265570 A1 | 12/2004 | Takahashi et al. | |
| 2005/0036223 A1 | 2/2005 | Wachenschwanz | |
| 2005/0120545 A1 | 6/2005 | Wachenschwanz et al. | |
| 2005/0249984 A1 * | 11/2005 | Ohmori et al. | 428/846.1 |
| 2006/0006135 A1 * | 1/2006 | Homola et al. | 216/22 |
| 2006/0093863 A1 | 5/2006 | Tsuchiya et al. | |
| 2006/0289382 A1 * | 12/2006 | Kikitsu et al. | 216/22 |
| 2007/0041306 A1 * | 2/2007 | Wachenschwanz et al. | 369/272.1 |

FOREIGN PATENT DOCUMENTS

| | | |
|---|---|---|
| EP | 1258866 | 11/2002 |
| JP | 63-048610 A | 3/1988 |
| JP | 02-023517 A | 1/1990 |
| JP | 03-142702 | 6/1991 |
| JP | 03-142707 | 6/1991 |
| JP | 06-318302 | 11/1994 |
| JP | 10-149539 A | 6/1998 |
| JP | 2000099942 A | 4/2000 |
| WO | WO00/48172 | 8/2000 |

OTHER PUBLICATIONS

Merriam Webster's Collegiate Dictionary, 10$^{th}$ Edition, 1997.

White, "Patterned Media: A Viable route to 50 Git/in$^2$ and Up for magnetic Recording?" Dept. of Electrical Engineering, Stanford University, Stanford, CA 94305, 1996.

Tohge et al., "Fine-Patterning On Glass Substrates By the Sol-Gel Method", Journal of Non-Crystalline Solids 100 (1988) pp. 501-505, vol. 100, Nos. 1-3, Mar. 1988, NCSBJ 100 (1-3) I-554, Journal of Non-Crystalline Solisd, Glasses and Glass Ceramics from Gels, Proceedings of the Fourth International Workshop on Glasses and Glass Ceramics from Gels, Kyoto, Japan, Jul. 13-15, 1987.

S.E. Lambert et al., "Beyond Discrete Tracks: Other Aspects of Patterned Media", Journal of Applied Physics, Proceedings of the Thirty-Fifth Annual Converence on Magnetism and Magnetic Materials, Apr. 15, 1991, p. 4724-4727.

D.J. Twisselman et al. "In-Plane Anisotropy in CoCr(Ta,Pt)/Cr Films Deposited Onto Substrates with Controlled Topography", Mat. Res. Soc. Symp. Proc. vol. 517, 1998 Materials Research Society, p. 193-198.

Tohge et al., "Patterning on Glass Substrates By the Sol-Gel method", Journal of Non-Crystalline Solids 100:501-503, 1988.

U.S. Appl. No. 11/588,699, Office Action dated Oct. 16, 2007, 9 pages.

Japanese Patent Application No. 2002-285575, English Translation of Notice of the Reasons for Refusal, dated Oct. 31, 2006, 3 pages.

Japanese Patent Application No. 2002-285575, English Translation of the Final Decision of Rejection, dated Jun. 19, 2007, 3 pages.

Office Action dated Oct. 16, 2007 from U.S. Appl. No. 11/588,699, 7 pages.

Office Action dated Apr. 18, 2008 from U.S. Appl. No. 11/588,699, 8 pages.

Office Action dated Nov. 12, 2008 from U.S. Appl. No. 11/588,699, 5 pages.

\* cited by examiner

PERPENDICULAR MAGNETIC DISCRETE TRACK RECORDING DISK

REFERENCE TO RELATED APPLICATION

This application is a continuation of Ser. No. 10/306,315 filed Nov. 27, 2002 now U.S. Pat. No. 7,147,790.

TECHNICAL FIELD

Embodiments of this invention relate to the field of disk drives and, more specifically, to disks used in disk drive systems.

BACKGROUND

A disk drive system includes one or more magnetic recording disks and control mechanisms for storing data on the disks. The disks are constructed of a substrate and multiple film layers. In most systems, an aluminum-based substrate is used. However, alternative substrate materials such as glass have various performance benefits such that it may be desirable to use a glass substrate. One of the film layers on a disk is a magnetic layer used to store data. The reading and writing of data is accomplished by flying a read-write head over the disk to alter the properties of the disk's magnetic layer. The read-write head is typically a part of or affixed to a larger body that flies over the disk, referred to as a slider.

The trend in the design of magnetic hard disk drives is to increase the recording density of a disk drive system. Recording density is a measure of the amount of data that may be stored in a given area of a disk. For example, to increase recording density, head technology has migrated from ferrite heads to film heads and later to magneto-resistive (MR) heads and giant magneto-resistive (GMR) heads.

Current disk drive products use longitudinal magnetic recording technology. However, perpendicular magnetic recording systems have been developed to achieve higher recording density. A typical perpendicular recording head includes a trailing write pole, a leading return or opposing pole magnetically coupled to the write pole, and an electrically conductive magnetizing coil surrounding the yoke of the write pole. The bottom of the opposing pole has a surface area greatly exceeding the surface area of the tip of the write pole. Conventional perpendicular recording media typically includes a hard magnetic recording layer and a soft magnetic underlayer which provide a flux path from the trailing write pole to the leading opposing pole of the writer. To write to the magnetic recording media, the recording head is separated from the magnetic recording media by a distance known as the flying height. The magnetic recording media is moved past the recording head so that the recording head follows the tracks of the magnetic recording media, with the magnetic recording media first passing under the opposing pole and then passing under the write pole. Current is passed through the coil to create magnetic flux within the write pole. The magnetic flux passes from the write pole tip, through the hard magnetic recording track, into the soft underlayer, and across to the opposing pole.

Achieving higher areal density (i.e., the number of stored bits per unit surface area) requires that the data tracks be close to each other. One problem with current perpendicular magnetic recording media is that because the soft magnetic underlayer contains magnetic granular structures that are exchange coupled in the plane of the substrate, a large number of magnetic domains within the soft magnetic underlayer are formed. As such, any magnetization transition in the soft magnetic underlayer would be at least as broad as a typical domain wall width, thereby limiting how narrow a data track may be. This is a problem because sharp head field gradients are needed to write narrow transitions in the perpendicular hard magnetic films.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

It should be noted that the apparatus and methods discussed herein may be used with various types of disks. In one embodiment, for example, the apparatus and methods discussed herein may be used with a magnetic recording disk. Alternatively, the apparatus and methods discussed herein may be used with other types of digital recording disks, for example, optical recording disks such as a compact disc (CD) and a digital-versatile-disk (DVD).

A perpendicular magnetic recording disk having a soft magnetic underlayer and a discrete track recording pattern is described. The discrete track recording pattern provides inter-track isolation within the soft magnetic underlayer. The recording disk has a substrate, a soft magnetic underlayer disposed above the substrate, and a magnetic recording layer disposed above the soft magnetic underlayer.

Methods for patterning the soft magnetic layer with the discrete track recording pattern are described. The soft magnetic underlayer, continuous throughout the discrete track recording pattern, may initially be imprinted with a stamper that forms an intermediate pattern relative the final discrete track recording pattern. In one embodiment, a method of forming the discrete track recording pattern involves a subtractive process in which portions of the soft magnetic underlayer are removed to form raised and recessed zones (i.e., data and non-data zones). In another embodiment, an additive process may be used in which a material compatible with the soft magnetic underlayer may be plated up on the soft magnetic underlayer to form the discrete track recording pattern. In one embodiment, the discrete track recording pattern does not extend down into the disk substrate.

Figure 1A:
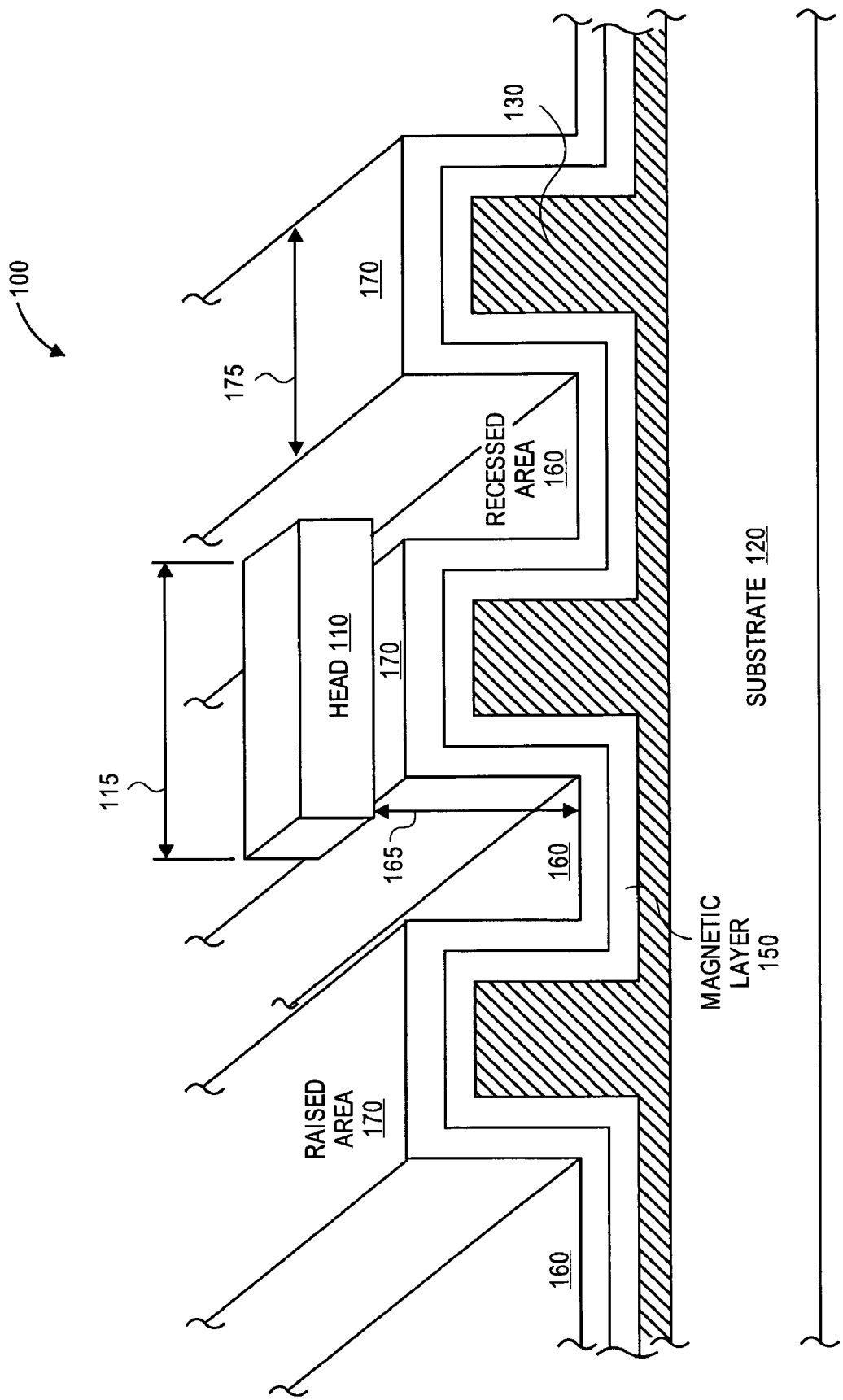
FIG. 1A illustrates a cross-sectional perspective view of one embodiment of a patterned disk and a write element of a head.

Although a discussion of the operation of a disk drive system is not strictly necessary for the present invention, a description thereof may aid in understanding the operation and advantages provided by a disk having a perpendicular magnetic recording pattern. FIG. 1A illustrates a cross-sectional perspective view of a patterned disk and a write element of a head. The disk 100 includes multiple film layers that have been omitted for clarity of the following discussion. During operation of a disk drive, reading and writing of data on the disk 100 is accomplished by flying, for example, a read-write head 110 over the disk 100 to alter the properties of the disk's magnetic layer 150. To perform a transfer of data with the disk 100, the head 110 is centered above a track of the rotating disk 100. The recording head 110 may be, for example, a dual element head having a read element for performing a read operation and a write element for performing a write operation.

The disk 100 includes a substrate 120, and multiple film layers disposed above the substrate 120. The disks described herein may be manufactured with, for examples, a glass substrate or metal/metal alloy substrate. Glass substrates that may be used include, for example, a silica containing glass such as borosilicate glass and aluminosilicate glass. Metal alloy substrates that may be used include, for example, aluminum-magnesium (AlMg) substrates. In an alternative embodiment, other substrate materials including polymers and ceramics may be used.

The multiple film layers include a soft magnetic underlayer 130 and magnetic layer 150. A discrete track recording pattern is formed into the soft magnetic underlayer 130. A magnetic layer 150 is disposed above the soft magnetic underlayer 130. The discrete track recording pattern includes recessed zones 160 and raised zones 170. The recessed zones 160 have a depth 165 relative to the recording head 110 and/or raised zones 170. In one embodiment, the width 115 of the head 110 is greater than the width 175 of the raised zones 170 such that portions of the head 110 extend over the recessed zones 160 during operation. However, the recessed zones 160 are sufficiently separated by a distance 165 from the head 110 to inhibit storage of data by the head 110 in the magnetic layer 150 directly below the recessed zones 160. The raised zones 170 are sufficiently close to the head 110 to enable the writing of data in the magnetic layer 150 directly below the raised zones 170. In one embodiment, for example, a width 175 of each raised zone may be about 1250 angstroms (Å) and a width of each recessed zone may be typically about ⅓ of the raised zone, or about 400 Å. A depth 165 of each recessed zone, for example, may also be about 400 Å. In other embodiments, the raised and recessed zones may have a pitch between about 200-2000 Å. The dimensions discussed are only exemplary and may have other embodiments.

Therefore, when data are written to the recoding medium, the raised zones 170 of soft magnetic underlayer 130 correspond to the data tracks. Information, such as servo (head positioning) information may be stored in the recessed zones 160. Alternatively, servo information may be interleaved with data in sectors on stored on the raised zones 170. The raised zones 170 and recessed zones 160 are typically formed as alternating concentric circles although other configurations (e.g., spiral) are contemplated. The recessed zones 160 isolate the raised zones 170 (e.g., the data tracks) from one another, resulting in data tracks that are defined both physically and magnetically.

When data are written by the head 110 to a particular data track (raised zone or area), data are inhibited from being written to adjacent recessed zones 160 because the magnetic layer 150, below the recessed surface zone 160, is too far from the head 110 for the head 110 to induce magnetic transitions there. If new data are written on a subsequent write operation, there should be no residual data from an earlier operation in the raised zones 170 or recessed zones 160. Thus, when the head 110 reads data from a raised zone 170, only data from the preceding write operation is present and read.

Figure 1B:
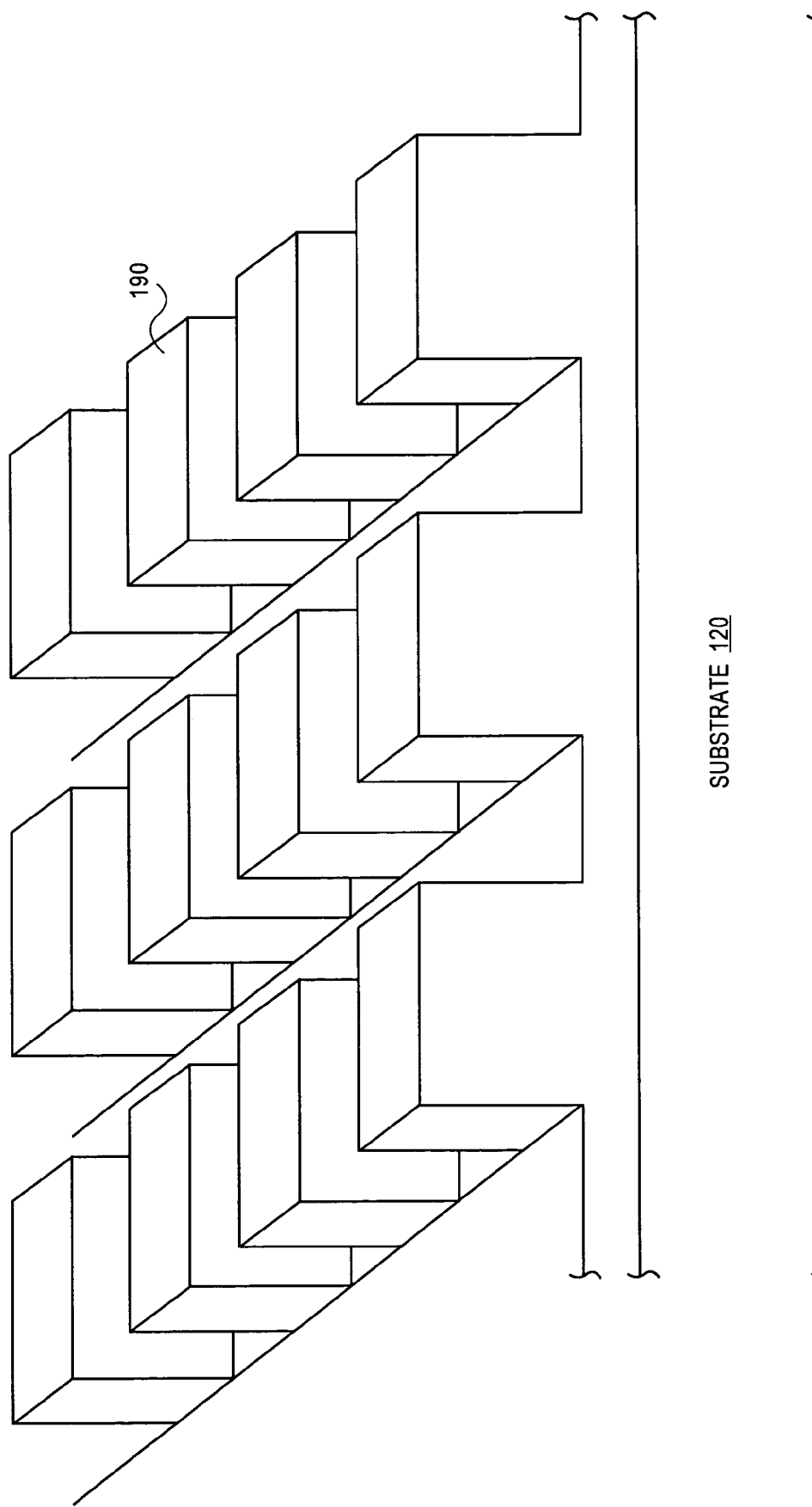
FIG. 1B illustrates a cross-sectional perspective view of an alternative embodiment of a patterned disk.

It should be noted that various types of discrete track patterns may be generated by stampers in addition to what is illustrated in FIG. 1A. For example, in an alternative embodiment, the discrete track pattern formed in the soft magnetic underlayer may include data islands as illustrated in FIG. 1B. Each of the data islands 190 may hold a block of data (e.g., one bit or multiple bits) and are isolated form one another by the recessed zones. Such a configuration may reduce the amount of noise (e.g., noise between tracks and between blocks of data or bits) that is sensed by the read head 110. In other examples, the recessed and raised zones may have alternate shapes that still isolate data blocks from recessed zones.

A method to form a continuous soft magnetic underlayer that has a discrete track recording pattern is described. The method may involve first imprinting an embossable layer disposed above the soft magnetic underlayer followed by a subtractive or additive process to form the desired pattern. Imprinting the embossable layer may utilize lithography techniques, for example, nanoimprint lithography.

Figure 2A:
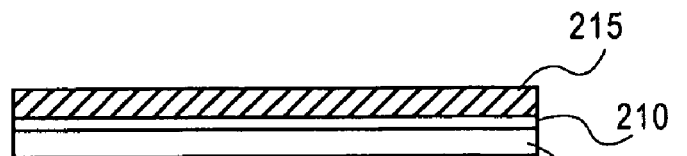
FIGS. 2A-2F show expanded cross sectional views illustrating an exemplary embodiment of a method of forming a discrete track recording pattern on the soft magnetic underlayer.

FIGS. 2A-2F show expanded cross sectional views illustrating one embodiment of forming a discrete track recording pattern on a soft magnetic underlayer of a perpendicular magnetic recording disk. In this embodiment, the method involves a subtractive process in which a layer or layers disposed on a disk substrate may be removed (e.g., through imprint lithography and etching) to expose a desired pattern on the soft magnetic underlayer. For clarity of explanation, the various layers illustrated in FIGS. 2A-2F are exemplary and may not be scaled to representative sizes. As shown in FIG. 2A, the patterning process begins with a disk-shaped substrate 205. Disk substrate 205, as discussed above, may be made of a number of materials including metal (e.g., aluminum), metal alloy, glass, silicon or other materials.

In one embodiment, disk substrate 205 may be plated with a nickel-phosphorous (NiP) layer 210. NiP layer 210 may be formed by electroplating, electroless plating, or by other methods known in the art. Plating disk substrate 205 with a rigid or metallic material such as NiP provides mechanical support to disk substrate 205 for subsequent polishing, and/or patterning processes. Plating of disk substrate 205 may not be necessary, however, if disk substrate 205 is composed of a sufficiently rigid or hard material such as glass. In one embodiment, NiP layer 210 may then be polished, planarized, and/or textured. In one embodiment, NiP layer 210 may be polished, for example, by a uniform etch. In alternative embodiments, other polishing techniques may be used. Polishing techniques are well known in the art; accordingly, a detailed discussion is not provided. Next, in one embodiment, NiP layer 210 may be textured with a pattern, by various methods such as mechanical texturing using fixed or free abrasive particles (e.g., diamond). Alternatively, other types of texturing methods, such as laser texturing, may be used.

In an alternative embodiment, disk substrate 205 may not be plated with NiP layer 210 if disk substrate 205 is made of a sufficiently rigid material (e.g., glass) as not to require the support provided by a NiP layer. Accordingly, disk substrate 205 may be polished, planarized, and/or textured using methods described above.

As further illustrated by FIG. 2A, soft magnetic underlayer 215 is disposed above disk substrate 205 and NiP layer 210 to achieve the proper magnetic properties associated with perpendicular magnetic recording. Soft magnetic underlayer 215 may be, in one embodiment, iron-cobalt-nickel (FeCoNi). Other materials that may be used for the soft magnetic underlayer 215 include cobalt-iron (CoFe) nickel-iron (NiFe), and alloys thereof. Soft magnetic underlayers and materials that may be used for manufacturing a soft magnetic underlayers are well known in the art of magnetic recording disks; accordingly, a detailed discussion is not provided.

Figure 7A:
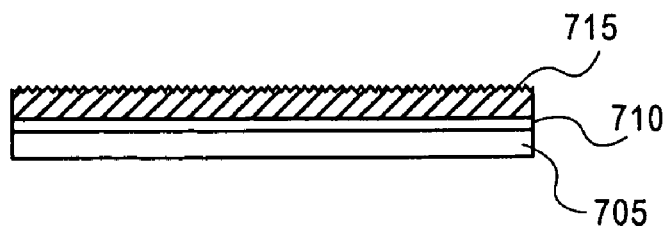
FIG. 7A illustrates one embodiment of textured soft magnetic underlayer disposed above a substrate.
Figure 7B:
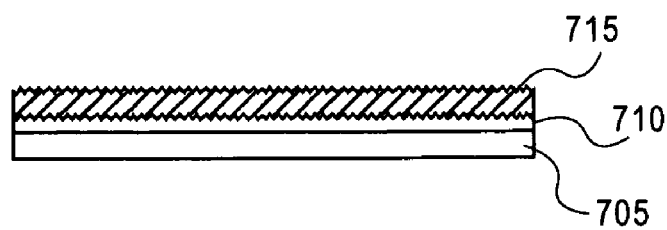
FIG. 7B illustrates one embodiment of textured soft magnetic underlayer disposed above a textured NiP layer.
Figure 7C:
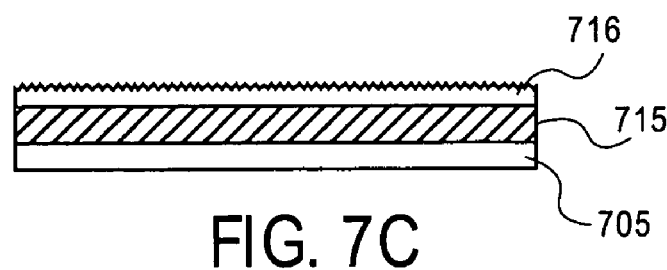
FIG. 7C illustrates one embodiment of textured NiP layer disposed above a soft magnetic underlayer.
Figure 7D:
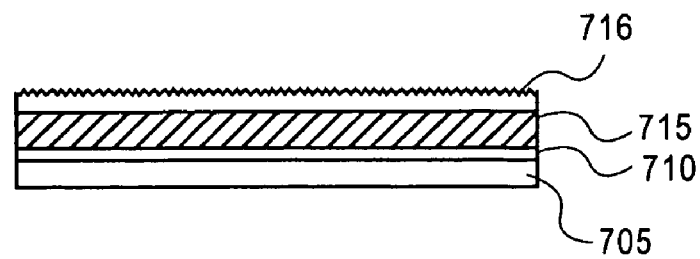
FIG. 7D illustrates another embodiment of textured NiP layer disposed above a soft magnetic underlayer.

In an alternative embodiment, the soft magnetic underlayer disposed above the disk substrate may be polished and/or textured. FIG. 7A illustrates one embodiment of a textured soft magnetic underlayer 715 disposed above disk substrate 705 plated with a NiP layer 710. Soft magnetic underlayer 715 may be textured with a pattern, by various methods such as mechanical texturing using fixed or free abrasive particles (e.g., diamond). Alternatively, other types of texturing methods, such as laser texturing, may be used to texture soft magnetic underlayer 715. In one embodiment, the texturing of soft magnetic underlayer 715 may be in addition to the texturing of NiP layer 710 as illustrated in FIG. 7B. In an embodiment where NiP layer 710 is absent, substrate 705 may be polished and/or textured. In yet another embodiment, a thin NiP layer 716 may be disposed on soft magnetic underlayer 715 and polished and/or textured, as illustrated in FIG. 7C. A polished and/or textured NiP layer 716 may be in addition to a (polished and/or textured) NiP layer 710 disposed above substrate 705, as illustrated in FIG. 7D.

Figure 2B:
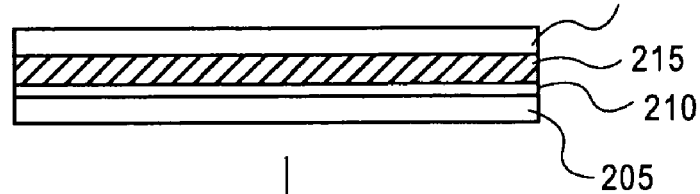

Next, as illustrated by FIG. 2B, disk substrate 205 may then be coated with a polymer film to form embossable layer 220, for example, with a photoresist, an electron sensitive resist, or other embossable materials. Spin coating, dip coating, and spray coating are just some methods of disposing the embossable layer 220 on soft magnetic underlayer 215. Other coating methods such as sputtering and vacuum deposition (e.g., CVD) may be used. Other embossable layer materials such as a dye polymer may be used, with other examples including thermoplastics (e.g., amorphous, semi-crystalline, crystalline), thermosetting (e.g., epoxies, phenolics, polysiloxanes, ormosils, sol-gel), and radiation curable (e.g., UV curable, electron-beam curable) polymers. Embossable layer 220 may also be referred to as a "masking layer." In one embodiment, embossable layer 220 may have a thickness in the range of about 100-5000 Å. Alternatively, embossible layer 220 may have other thicknesses.

Figure 2C:
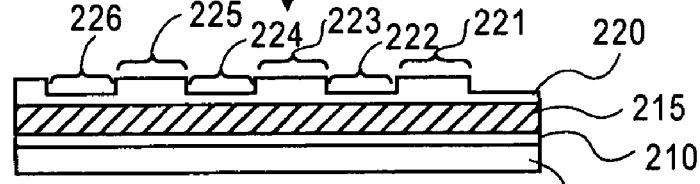

Next, as illustrated by FIG. 2C, embossable layer 220 is imprinted with a pattern of recessed zones (222, 224, 226) and raised zones (221, 223, 225). The stamping of embossable layer 220 may utilize, for example, nanoimprint lithography techniques that are well known in the art. In one embodiment, a stamper (not shown) bearing a discrete track recording pattern, may be used to impress embossable layer 220 to form recessed zones (222, 224, 226) and raised zones (221, 223, 225). Because of the thickness of the embossable layer 220, the imprint of raised and recessed zones are not likely to press into soft magnetic underlayer 215. Alternatively, if embossable layer 220 is relatively thin, it may be stamped to leave very little embossable material in the recessed zones (222, 224, 226). Subsequently, embossable material in the recessed zones (222, 224, 226) may be removed to expose soft magnetic underlayer 215. The stamper used to pattern the embossable layer 220 has the inverse, or negative replica, of the desired pattern (i.e., the discrete track recording pattern on soft magnetic underlayer 215) to be formed.

Figure 2D:
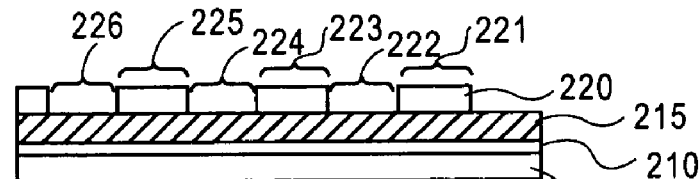

Next, as illustrated by FIG. 2D, embossable layer 220 may be etched to further define the alternating recessed zones (222, 224, 226) and raised zones (221, 223, 225) that form the basis for the discrete track recording pattern on soft magnetic underlayer 215. In one embodiment, a series, or step-wise process of etching procedures may be performed on embossable layer 220 and soft magnetic underlayer 215 to form the desired track pattern. Embossable layer 220 serves as a stencil to expose the soft magnetic underlayer 215 in areas beneath recessed zones (222, 224, 226) of the pattern formed by the stamper. In one embodiment, plasma etching is utilized to remove embossable layer 220 material. Alternatively, other etching methods may be used to remove embossable layer 220 material in at least the recessed zones, for example, using chemical etching, electron beam (e-beam) etching, ion-beam etching (passive or reactive) sputter etching, and plasma etching with reactive gases. For certain types of etching (e.g., chemical), embossable layer material may be removed from both the raised zones (221, 223, 225) and recessed zones (222, 224, 226) at approximately a similar rate. Chemical etching will remove the embossable layer 220 in both the recessed zones (222, 224, 226) and raised zones (221, 223, 225) until soft magnetic underlayer 215 is exposed in the recessed zones (222, 224, 226), as illustrated by FIG. 2D.

Figure 2E:
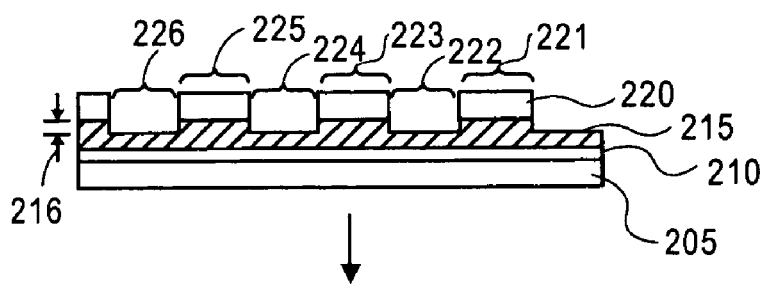
Figure 2F:
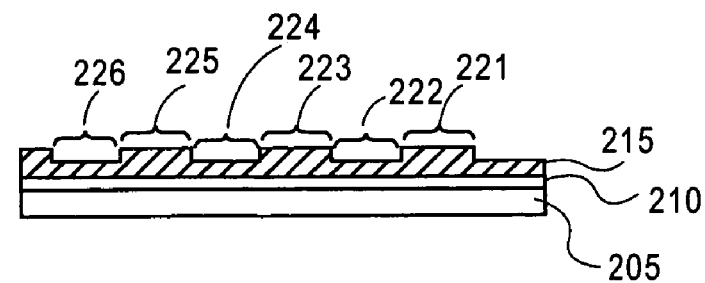

Next, as illustrated by FIG. 2E, recessed zones (222, 224, 226) of soft magnetic underlayer 215 are further etched (e.g., by chemical, e-beam, ion-beam, or sputter etching). In one embodiment, recessed zones (222, 224, 226) may not penetrate through soft magnetic underlayer 215 to disk substrate 205 such that soft magnetic underlayer 215 forms a continuous pattern of recessed zones (222, 224, 226) and raised zones (221, 223, 225). Having achieved a desired recess depth 216, the remaining embossable layer 220 on the raised zones (221, 223, 225) of the discrete track recording pattern may then be removed, for example, by the methods discussed above in relation to FIG. 2D, or by other methods such as polishing (e.g., fine, kiss, and coarse polishing). The removal of embossable layer 220 exposes the entire top surface of the patterned soft magnetic underlayer 215 as illustrated by FIG. 2F.

In one embodiment, soft magnetic underlayer 215 may be polished and/or textured. In one embodiment, soft magnetic underlayer 215 may be polished and/or textured when disposed above NiP layer 210 (with respect to FIG. 2A). In an alternative embodiment, soft magnetic underlayer 215 may be polished and/or textured after raised zones raised zones (221, 223, 225) of the discrete track recording pattern have been formed (with respect to FIG. 2F). Texturing of the soft magnetic underlayer 215 may be achieved with any of the texturing techniques discussed above. It should also be noted that various cleaning and/or polishing operations may be performed in between the stages discussed above. For example, one or more polishing operations (e.g., fine/kiss, coarse) may be performed to remove asperities from the surface of one or more of the layers. Asperities residing on the surface of any layer may have negative effects on the performance of the manufactured disk. With soft magnetic underlayer 215 now patterned with a discrete track recording pattern, other layers (e.g., a magnetic layer) may be disposed above soft magnetic underlayer 215 to complete the disk manufacturing process.

FIGS. 3A-3F are expanded cross sectional views illustrating an alternative embodiment of forming a discrete track recording pattern on a soft magnetic underlayer of a perpendicular magnetic recording disk. This method involves an additive process in which a material compatible or identical to material forming the initial soft magnetic underlayer is added or plated to form the raised zones of the discrete track recording pattern. The various layers illustrated in FIGS. 3A-3F are exemplary and not scaled to proper sizes so that the process of patterning the soft magnetic underlayer may be described with clarity.

Figure 3A:
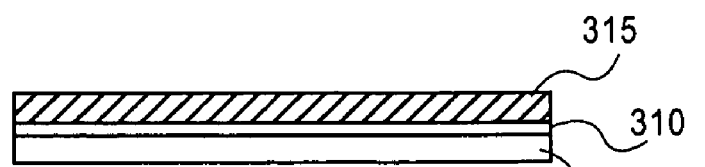
FIGS. 3A-3F show expanded cross sectional views illustrating another exemplary embodiment of a method of forming a discrete track recording pattern on the soft magnetic underlayer.

The additive process illustrated by FIGS. 3A-3F are analogous to the subtractive process illustrated by FIGS. 2A-2F with respect to the stamping and etching of the embossable layer 320 disposed above the soft magnetic underlayer 315. As illustrated by FIG. 3A, the process begins with NiP layer 310 disposed on disk substrate 305. Although plating of disk substrate 305 may not be necessary depending on the substrate material, the use of NiP layer 310 may provide mechanical support to substrate 305 during the patterning process. Disk substrate 305, as discussed above, may be made of a number of materials including, for examples, metal (e.g., aluminum), metal alloy and glass. Soft magnetic underlayer 315 is disposed above disk substrate 305 and NiP layer 310. Soft magnetic underlayer 315 may be composed of, in one embodiment, iron-cobalt-nickel (FeCoNi). In one embodiment, NiP layer 310 may be polished and/or textured before soft magnetic underlayer 315 is disposed above it. Alternatively, if a NiP layer is not used, disk substrate 305 may be polished and/or textured.

Figure 3B:
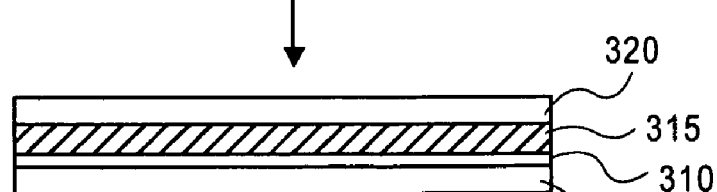
Figure 3C:
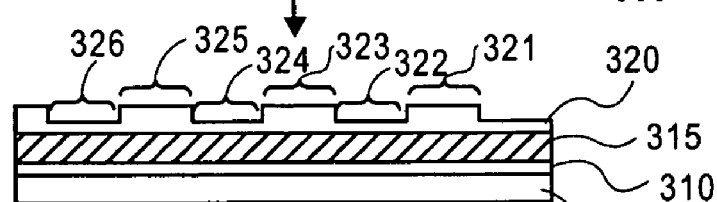

As illustrated by FIG. 3B, disk substrate 305 may then be coated with an embossable layer 320, for example, a photoresist, an electron sensitive resist, or other embossable materials. Spin coating, dip coating, and spray coating are just some methods of disposing the embossable layer 320 on substrate 305. Other coating methods and embossable layer materials may be used as discussed above. Next, as illustrated by FIG. 3C, a stamper (not shown) bearing a discrete track recording pattern, may be used to impress embossable layer 320 to form recessed zones (322, 324, 326) and raised zones (321, 323, 325). If embossable layer 320 is thick relative to the depth of the stamper's pattern, the imprint from the stamper is not likely to register deep enough to reach soft magnetic underlayer 315. Alternatively, if embossable layer 320 is relatively thin, it may be stamped to leave very little embossable material in the recessed zones (322, 324, 326). Subsequently, embossable material in the recessed zones (322, 324, 326) may be removed to expose soft magnetic underlayer 315. The stamper used to pattern the embossable layer 320 may have a pattern that is identical to the pattern to be formed on soft magnetic underlayer 315.

Figure 3D:
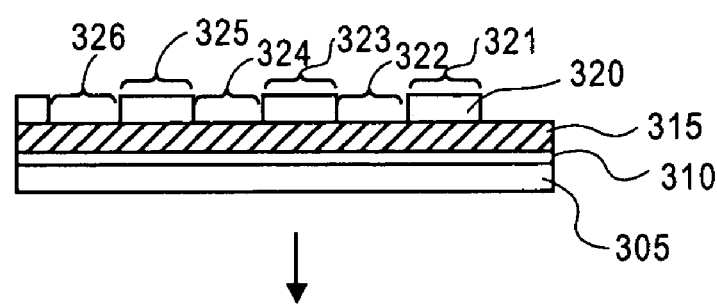

Next, as illustrated by FIG. 3D, embossable layer material in the recessed zones (322, 324, 326) may be removed by a number of etching methods (e.g., by chemical, plasma, e-beam, ion-beam, or sputter etching), such that a surface of soft magnetic underlayer 315 may be exposed. For certain types of etching (e.g., chemical), embossable layer material may be removed from both the raised zones (321, 323, 325) and recessed zones (322, 324, 326) at approximately a similar rate. Chemical etching will remove the embossable layer 320 in both the recessed zones (322, 324, 326) and raised zones (321, 323, 325) until soft magnetic underlayer 315 is exposed in the recessed zones (322, 324, 326), as illustrated by FIG. 3D.

Figure 3E:
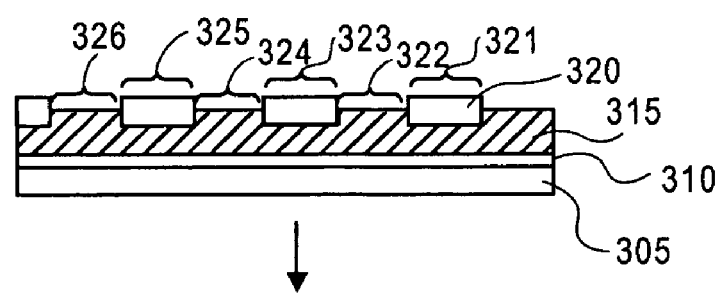
Figure 3F:
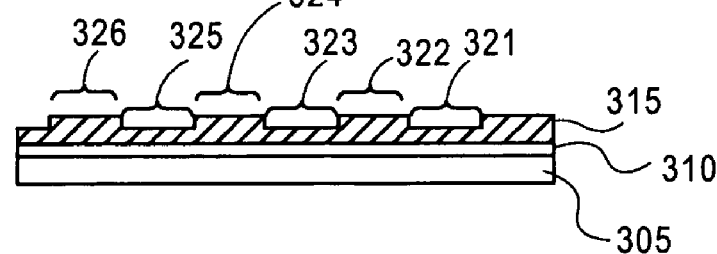

Next, as illustrated by FIG. 3E, recessed zones (322, 324, 326) may be deposited with a material identical to or compatible with soft magnetic underlayer 315, such that recessed zones (322, 324, 326) become filled to a level comparable to the top surface of raised zones (321, 323, 325). Then, as illustrated by FIG. 3F, the remaining segments of embossable layer 320 may be removed, for example, by chemical etching so that only soft magnetic underlayer 315 remains. Upon removal of embossable layer 320, zones 322, 324, 326 that were once recessed zones are now raised zones that form the data zones of the soft magnetic recording layer 320. Analogously, zones 321, 323, 325 that formed the raised zones (until plating recessed zones 322, 324, 326 at FIG. 3E) are now the recessed zones positioned between raised data zones (322, 324, 326) as illustrated by FIG. 3F.

In an alternative embodiment, raised zones (322, 324, 326) of FIG. 3F may be formed by first depositing a soft magnetic underlayer material over the imprinted embossable layer 320 (e.g., at FIG. 3D) by various deposition methods such as chemical vapor deposition (CVD), sputtering, and ion beam deposition. Next, the embossable layer material may be selectively removed by any number of etching methods described herein (e.g., plasma etching). In doing so, any soft magnetic underlayer material deposited above the embossable layer becomes "lifted off," resulting in the raised zones (322, 324, 326) and recessed zones (321, 323, 325) of FIG. 3F.

After forming the discrete track recording pattern of raised zones (322, 324, 326) and recessed zones (321, 323, 325) shown in FIG. 3F, the raised zones (322, 324, 326) may, in one embodiment, be polished and/or textured. Texturing of the raised zones (322, 324, 326) of soft magnetic underlayer 315 may be achieved with any of the texturing techniques discussed above.

The process of forming a discrete track recording pattern illustrated in FIGS. 2A-2F differs from the process illustrated and described in FIGS. 3A-3F in that the former process forms the recessed zones of the soft magnetic underlayer by etching into the soft magnetic underlayer to remove material making up the soft magnetic underlayer. The initial stamping of the embossable layer serves as a template corresponding to the raised and recessed zones. In the method described and illustrated by FIGS. 3A-3C, the initial recessed impressions formed by a stamper (e.g., recessed zones 322, 324, 326 shown in FIG. 3C) form what will eventually become the raised data zones 322, 324, 326 (as shown in FIG. 3F). As such, the stamper utilized to form the impression shown in FIG. 3C may form wider recessed zones compared to the raised zones because ultimately, recessed zones that become the raised data zones of the soft magnetic underlayer should be wider than the recessed zones.

As previously noted various cleaning and/or polishing operations may be performed in between the stages discussed above, for example, to remove asperities from the surface of one or more of the layers.

Figure 6A:
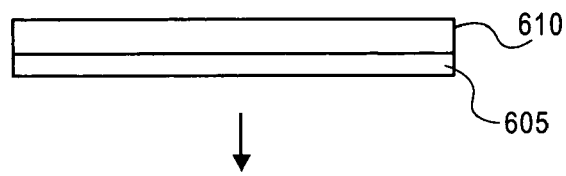
FIGS. 6A-6I show expanded cross sectional views illustrating another exemplary embodiment of a method of forming a discrete track recording pattern on the soft magnetic underlayer.

FIGS. 6A-6I show expanded cross sectional views illustrating yet another embodiment of forming a discrete track recording pattern on a perpendicular magnetic recording disk. In this embodiment, the pattern is formed on a NiP layer disposed below a soft magnetic underlayer. This method involves a variation of the additive process described above with respect to FIGS. 3A-3F. The various layers illustrated in FIGS. 6A-6I are exemplary and not scaled to proper sizes so that the process of patterning the soft magnetic underlayer may be described with clarity. As illustrated by FIG. 6A, the process begins with NiP layer 610 disposed on disk substrate 605. Disk substrate 605 may be plated with NiP layer 610 by any one of the methods described above, including electro or electroless plating. Disk substrate 605, as discussed above, may be made of a number of materials including metal (e.g., aluminum), metal alloy, or glass. In one embodiment, NiP layer 610 may be polished and/or textured. Alternatively, if a NiP layer is not used, disk substrate 605 may be polished and/or textured.

Figure 6B:
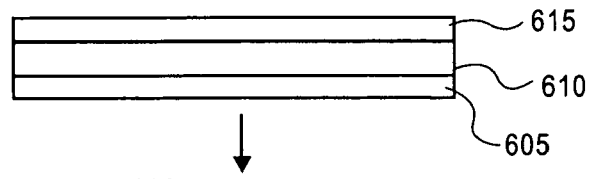

As illustrated by FIG. 6B, disk substrate 605 (with NiP layer 610) may then be coated with an embossable layer 615, for example, with a photoresist, an electron sensitive resist, or other embossable materials. Spin coating, dip coating, and spray coating are just some methods of disposing the embossable layer 615 on substrate 605. Other coating methods and embossable layer materials as discussed above may be used.

Figure 6C:
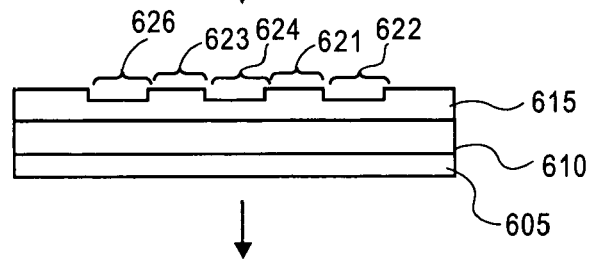
Figure 6D:
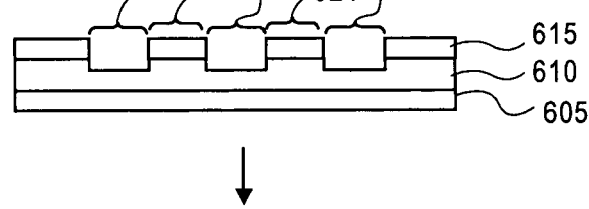
Figure 6E:
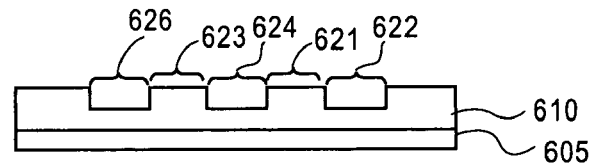

Next, as illustrated by FIG. 6C, a stamper (not shown) bearing a discrete track recording pattern, may be used to impress embossable layer 615 to form recessed zones (622, 624, 626) and raised zones (621, 623). If embossable layer 615 is thick relative to the depth of the stamper's pattern, the imprint formed by the stamper is not likely to register into NiP layer 610. Next, as illustrated by FIG. 6D, embossable layer 615 is etched into NiP layer 610. In one embodiment, plasma etching may be used to remove recessed zones (622, 624, 626) of embossable layer 615. Alternatively, other etching methods may be used to remove embossable layer 615 material in at least the recessed zones, for example, using chemical etching, electron beam (e-beam) etching, ion-beam etching (passive or reactive) sputter etching, and plasma etching with reactive gases. For certain types of etching (e.g., chemical), embossable layer material may be removed from both the raised zones (621, 623) and recessed zones (622, 624, 626) at approximately a similar rate. Chemical etching will remove the embossable layer 615 in both the recessed zones (622, 624, 626) and raised zones (621, 623) until NiP layer 610 is exposed in the recessed zones (622, 624, 626), as illustrated by FIG. 6D. Then, as illustrated by FIG. 6E, the remaining segments of embossable layer 615 may be removed, for example, by chemical etching so that only NiP layer 610 remains.

Figure 6F:
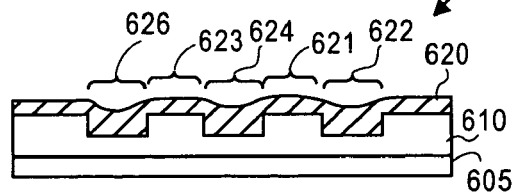
Figure 6H:
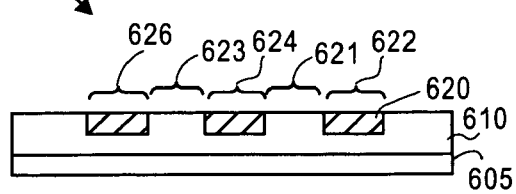
Figure 6G:
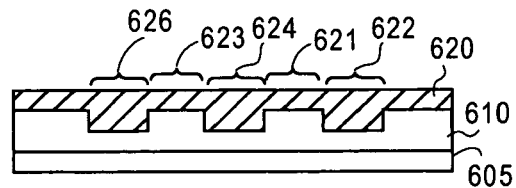
Figure 6I:
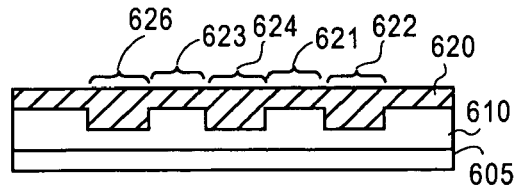

From this point, two alternative methods may be used to form a soft magnetic underlayer 620 above NiP layer 610. As illustrated by FIG. 6F, NiP layer 610 may be plated or deposited with a soft magnetic underlayer material that covers raised zones (621, 623) and fills recessed zones (622, 624, 626). Soft magnetic underlayer material may be, in one embodiment, iron-cobalt-nickel (FeCoNi). Then, as illustrated by FIG. 6G, soft magnetic underlayer 620 may be planarized and polished to form a smooth disk layer. Alternatively, as illustrated by FIG. 6H, recessed zones (622, 624, 626) may be filled with a soft magnetic underlayer material to a level substantially even with raised zones (621, 623). The soft magnetic underlayer material may also be planarized and polished to provide a smooth, even surface from zone to zone. Then, as illustrated by FIG. 6I, additional soft magnetic underlayer material may be deposited on raised zones (621, 623) and the filled recessed zones (622, 624, 626) to form soft magnetic underlayer 620. Soft magnetic underlayer 620 may subsequently be planarized and polished again. In one embodiment, the soft magnetic underlayer 620 formed in FIGS. 6G and 6I may be textured. Texturing of the soft magnetic underlayer 620 may be achieved with any of the texturing techniques discussed above. In an alternative embodiment, disk substrate 605 may not have NiP layer 610 disposed above it (e.g., if disk substrate is made of glass). As such, a discrete track recording pattern may be formed on the disk substrate 605 (not shown) using the same method described above with respect to FIGS. 6A-6I.

Figure 4:
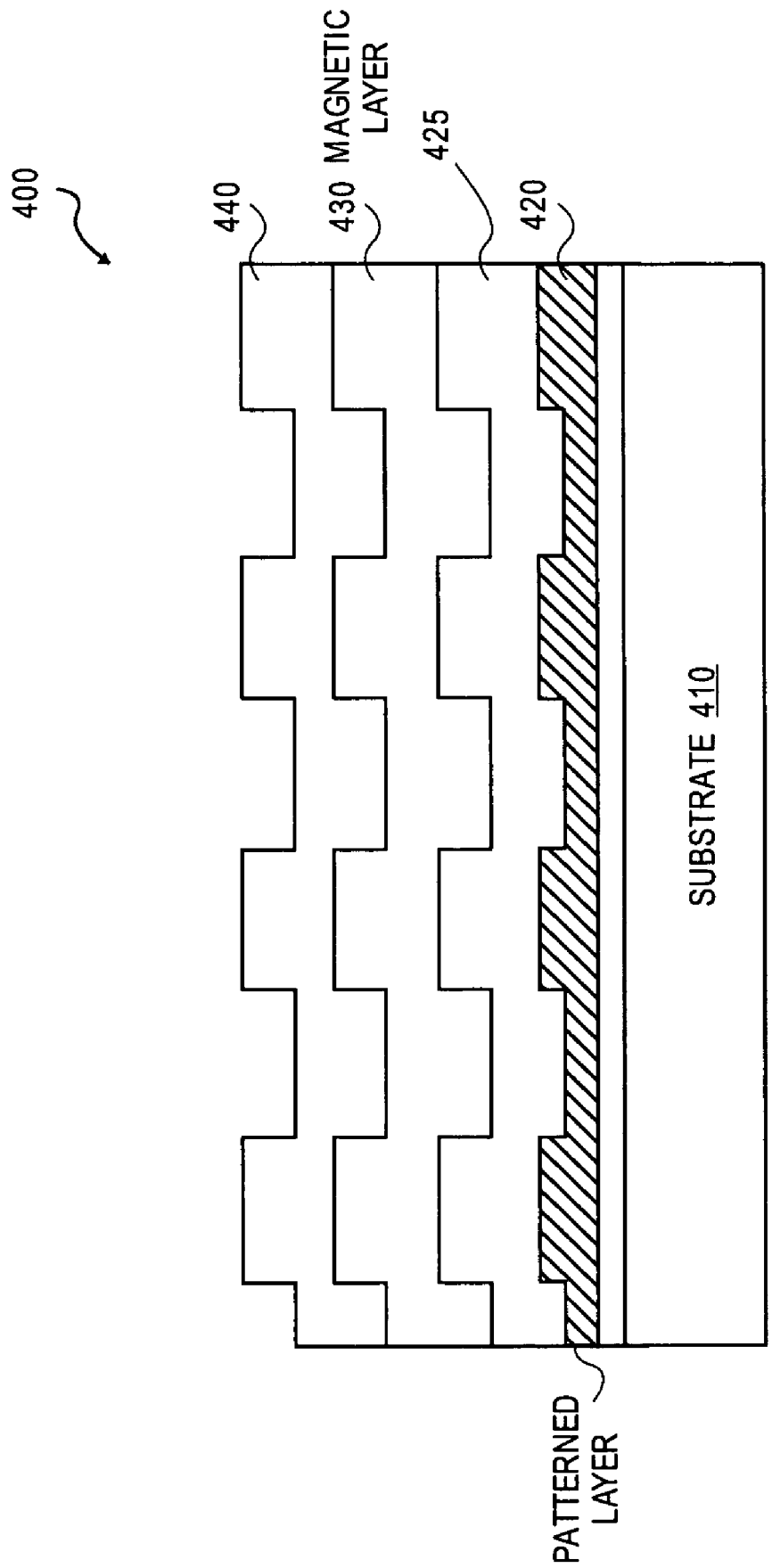
FIG. 4 is a cross section illustrating one embodiment of a recording disk having a patterned soft magnetic underlayer.

FIG. 4 is a cross section illustrating one embodiment of a perpendicular magnetic recording disk 400 having a patterned soft magnetic underlayer 420 disposed above disk substrate 410. In one embodiment, a discrete track pattern is generated on soft magnetic underlayer 420, as discussed above. The patternable soft magnetic underlayer 420 may be composed of FeCoNi. Alternatively, other materials may be used for soft magnetic underlayer 420, for examples, CoFe and FeAlN.

After the patterned soft magnetic underlayer 420 is generated (e.g., by the methods described above with respect to FIGS. 2A-2F or 3A-3F), additional layers such as a magnetic layer 430 are formed above soft magnetic underlayer 420 to generate the perpendicular magnetic recording disk. In one embodiment, one or more layers 425 may also be disposed between soft magnetic underlayer 420 and magnetic layer 430 (e.g., an intermediate layer) to facilitate a certain crystallographic growth within the magnetic layer 430. These layers may be of materials to provide reasonably good lattice match to the material used for the magnetic layer 430. Magnetic layers are known in the art; accordingly, a detailed discussion is not provided.

The disk 400 may also include one or more layers 440 disposed on top of the magnetic layer 430. For example, a protection layer may be deposited on top of the magnetic layer 430 to provide sufficient property to meet tribological requirements such as contact-start-stop (CSS) and corrosion protection. Predominant materials for the protection layer are carbon-based materials, such as hydrogenated or nitrogenated carbon. A lubricant may be placed on top of the protection layer to further improve tribological performance, for example, a perfluoropolyether or phosphazene lubricant. Protection and lubrication layers are known in the art; accordingly, a detailed discussion is not provided.

Figure 8:
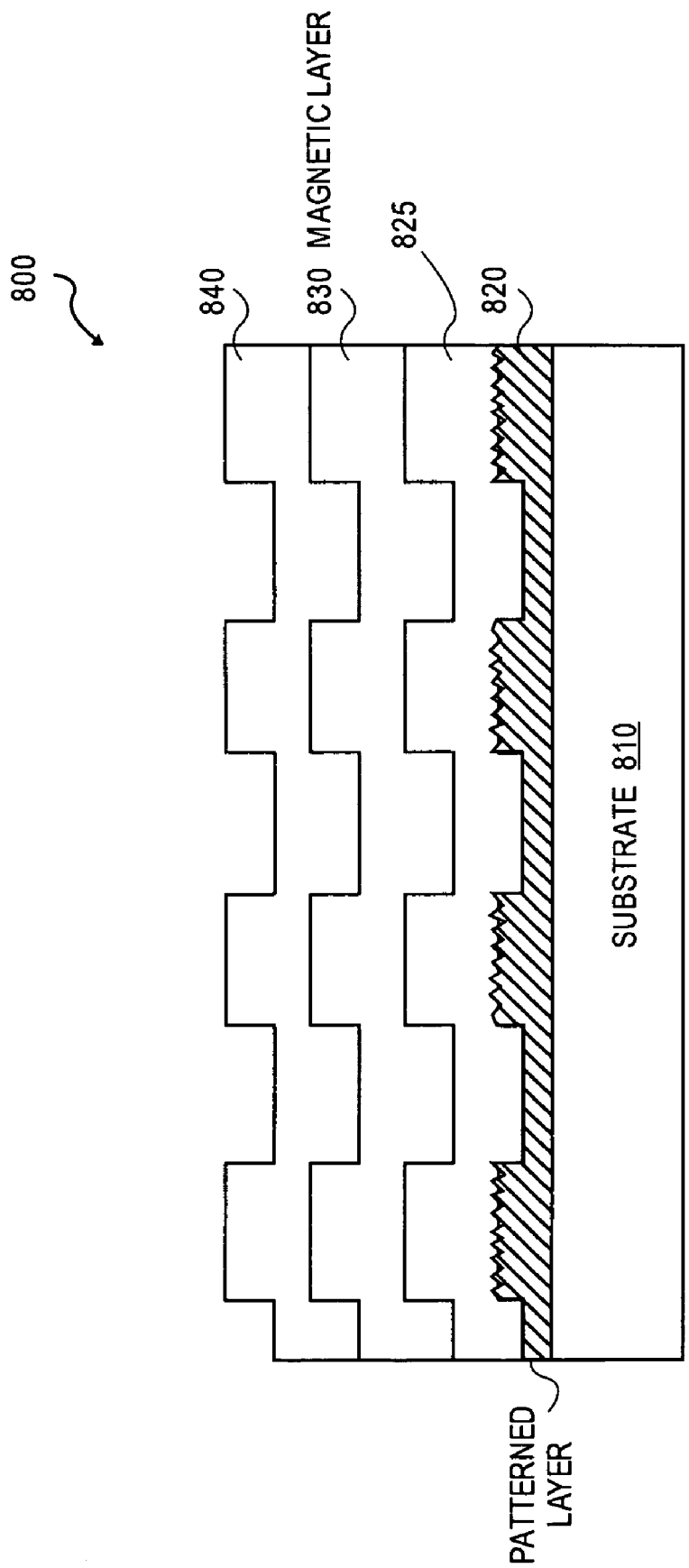
FIG. 8 is a cross section illustrating one embodiment of a recording disk having a textured and patterned soft magnetic underlayer.

FIG. 8 is a cross section illustrating one embodiment of a perpendicular magnetic recording disk 800 having a textured and patterned soft magnetic underlayer 820 disposed above disk substrate 810. In one embodiment, a discrete track pattern may be formed on soft magnetic underlayer 820, as discussed above (e.g., FIGS. 2A-2F, FIGS. 3A-3F, and FIG. 7). Recording disk 800 may also have additional layers such as a magnetic layer 830 disposed above soft magnetic underlayer 820 to generate a magnetic recording disk. In one embodiment, one or more layers 825 may also be disposed between soft magnetic underlayer 820 and magnetic layer 830 (e.g., an intermediate layer) to facilitate a certain crystallographic growth within the magnetic layer 830. The disk 800 may also include one or more layers 840 disposed on top of the magnetic layer 830. For example, a protection layer may be deposited on top of the magnetic layer 840 to provide sufficient property to meet tribological requirements such as contact-start-stop (CSS) and corrosion protection.

As previously discussed, the disk substrate and/or other layers (e.g., soft magnetic underlayer and NiP layer) may be textured, for example, to improve signal to noise ratio (SNR)

and thermal stability of the magnetic recording disk. The texturing may improve SNR and thermal stability by enabling control of crystallite size and crystallite size variance in the film layers deposited over the texturing. Although there are contribution to SNR from the disk drive electronics and the channel used to process the magnetic signal, there is also intrinsic noise from the media, itself, that should be minimized. A large contribution to the media noise is generated from the inter-particle (or inter-crystalline) magnetic exchange interaction that may be suppressed by isolating the magnetic crystals from each other by one or more nonmagnetic elements or compounds. However, another source of intrinsic media noise is the crystalline size and variance of the magnetic grain. The texturing of, for example, a substrate for perpendicular magnetic recording disks may improve control of crystallite size, spacing, and variance of the grains in the film layers (e.g., intermediate layer, underlayer, and/or nucleation layer) deposited over the substrate and, thereby, the magnetic recording layer.

Figure 5:
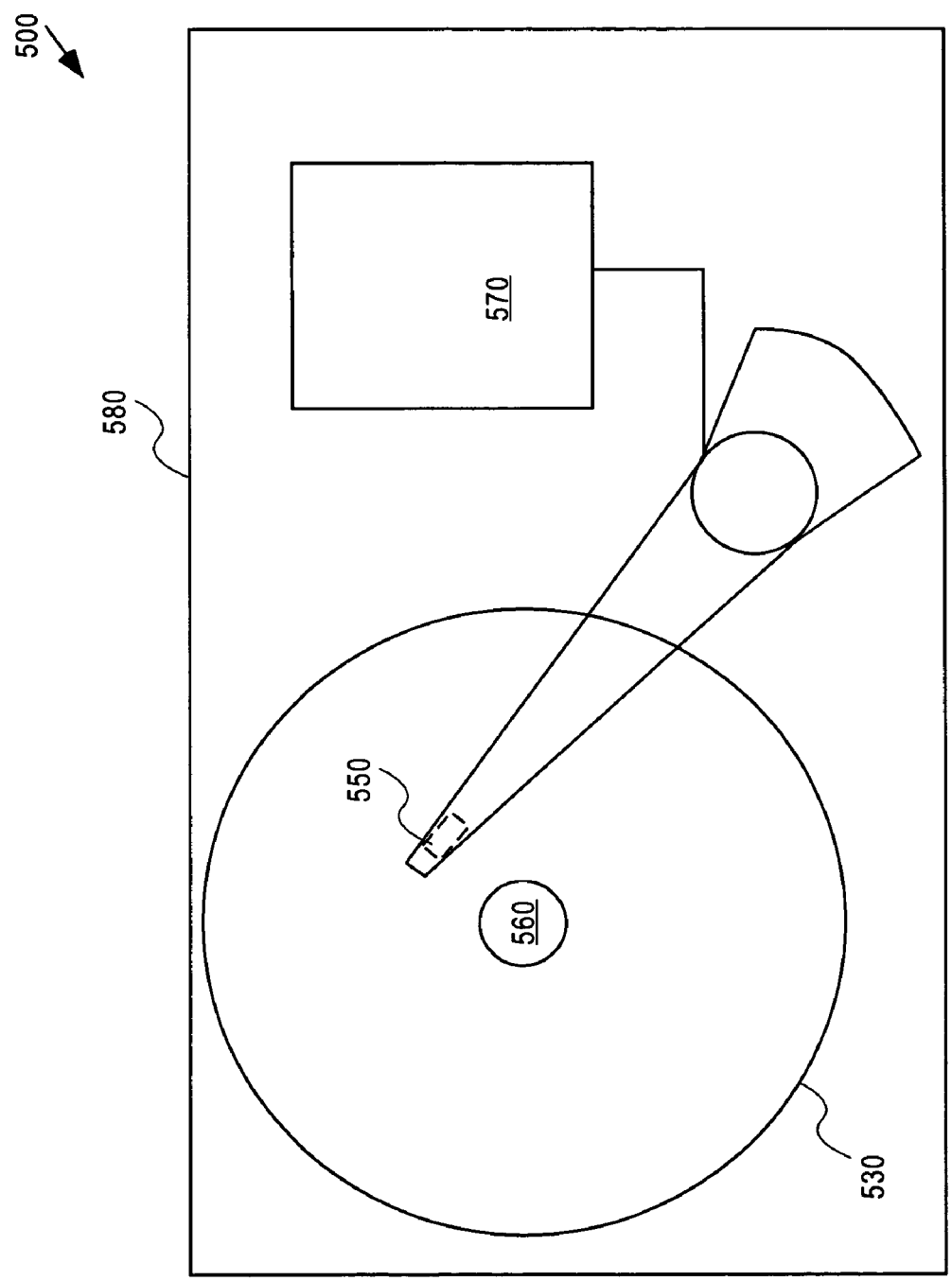
FIG. 5 illustrates one embodiment of a disk drive.

FIG. 5 illustrates a disk drive having disk (e.g., disk 400 of FIG. 4). Disk drive 500 may include one or more disks to store datum. The disk(s) 530 reside on a spindle assembly 560 that is mounted to drive housing 580. Datum may be stored along tracks in the magnetic recording layer of the disk(s) 530. The reading and writing of datum is accomplished with head 550 that is used to alter the properties of the magnetic recording layer of disk 530. A spindle motor (not shown) rotates spindle assembly 560 and, thereby, the disk(s) 530 to position head 550 at a particular location along a desired disk track. The position of head 550 relative to the disk may be controlled by position control circuitry 570.

In the foregoing specification, the invention has been described with reference to specific exemplary embodiments thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A method of fabricating a magnetic recording disk, comprising:
    disposing a radially continuous soft magnetic underlayer above a disk substrate;
    physically texturing the radially continuous soft magnetic underlayer; and
    forming a discrete track recording pattern on the radially continuous soft magnetic underlayer after the disposing of the radially continuous soft magnetic underlayer, wherein the discrete track pattern comprises a plurality of tracks and wherein the soft magnetic underlayer is retained continuously throughout the plurality of tracks.

2. The method of claim 1, further comprising disposing a NiP layer over the radially continuous soft magnetic underlayer.

3. The method of claim 2, further comprising texturing the NiP layer.

4. The method of claim 1, further comprising disposing a layer of NiP between the substrate and the radially continuous soft magnetic underlayer.

5. The method of claim 1, further comprising polishing the radially continuous soft magnetic underlayer before texturing.

6. The method of claim 1, wherein texturing the radially continuous soft magnetic underlayer is performed before forming the discrete track recording pattern.

7. The method of claim 1, wherein texturing the radially continuous soft magnetic underlayer is performed after forming the discrete track recording pattern.

8. A method of fabricating a magnetic recording disk, comprising:
    disposing a radially continuous soft magnetic underlayer above a disk substrate;
    polishing the continuous soft magnetic underlayer; and
    forming a discrete track recording pattern on the soft magnetic underlayer, wherein the discrete track pattern comprises a plurality of tracks and wherein the soft magnetic underlayer is retained continuously throughout the plurality of tracks.

9. The method of claim 8, wherein polishing the radially continuous soft magnetic underlayer is performed before forming the discrete track recording pattern.

10. The method of claim 8, wherein polishing the radially continuous soft magnetic underlayer is performed after forming the discrete track recording pattern.

* * * * *